United States Patent [19]

Strashun

[11] Patent Number: 4,812,125
[45] Date of Patent: Mar. 14, 1989

[54] INTERACTIVE TEACHING APPARATUS

[75] Inventor: Leonid Strashun, Reading, United Kingdom

[73] Assignee: Sony Corporation, Tokyo, Japan

[21] Appl. No.: 862,634

[22] Filed: May 13, 1986

[30] Foreign Application Priority Data

May 29, 1985 [GB] United Kingdom ............... 8513490
Feb. 27, 1986 [GB] United Kingdom ............... 8604887

[51] Int. Cl.$^4$ .................................................. G09B 9/00
[52] U.S. Cl. ................................... 434/224; 434/219
[58] Field of Search ........ 434/224, 323, 234, 307–309, 434/219; 340/722

[56] References Cited

U.S. PATENT DOCUMENTS

| | | | |
|---|---|---|---|
| 4,213,253 | 7/1980 | Gudelis et al. | 434/224 |
| 4,360,345 | 11/1982 | Hon | 434/323 |
| 4,413,314 | 11/1983 | Slater et al. | 340/722 |
| 4,464,120 | 8/1984 | Jensen | 434/224 |
| 4,613,952 | 9/1986 | McClanahan | 434/219 |

Primary Examiner—Maryann Lastova
Attorney, Agent, or Firm—Lewis H. Eslinger

[57] ABSTRACT

An interactive teaching apparatus comprises an actual operative piece of equipment, or a breadboard, which is the actual object of the training or study, an interface coupled to the equipment for deriving data from relevant points in the equipment, an interactive computer including a program which provides the background to the teaching exercise, monitors the progress of the trainee being taught, monitors the data supplied from the interface to the computer, and guides the trainee through the stages of the program, a reproduction medium with pre-recorded instructional sequences containing teaching information concerning the equipment and sequences showing the possible consequences of action by the trainee, and a dual-channel digital storage oscilloscope for displaying waveforms derived from the points and comparing them with stored waveforms.

13 Claims, 6 Drawing Sheets

INTERACTIVE TEACHING APPARATUS

BACKGROUND OF THE INVENTION

1. Field of the Invention

This invention relates to interactive teaching apparatus.

2. Description of the Prior Art

Interactive teaching apparatus is well known and descriptions of such apparatus and of the operation thereof can be found, for example, in UK patent specification No. GB-A-2 127 645, U.S. Pat. Spec. No. 4,170,832, European patent specification No. EP-A2-0 044 642, and "Interactive Videodisc Learning Systems" by Richard L Currier in High Technology, November 1983, pages 51 to 59.

Existing interactive and audio-visual teaching and training apparatus, for example, audio cassettes, slides, training tapes, disc-based programmes and even computer-aided interactive devices, are all based on simulation. Such apparatus limits itself to teaching the theoretical concepts in a relaxed atmosphere where time is not of the essence in taking appropriate action or in finding the correct control, such as a switch, button, or potentiometer, while the consequences of any wrong action are never even potentially disastrous. The training given by such apparatus is commonly no substitute for a real working environment with its stringent demands for rapid and correct action. The necessary competence can usually only be acquired after lengthy practice and by actually experiencing various emergency situations. Moreover, there is the further problem that many of the systems and equipments for which training have to be given are very expensive, are almost constantly in use, are increasingly reliable, and are even to some extent self-repairing, so it is becoming increasingly difficult to gain the necessary experience, particularly in respect of reflex action in a potential emergency. However, absence of the necessary competence gained through training can in some cases result in a dangerous situation or in many cases in situations where the lack of expertise is clearly apparent. For example, in the field of broadcast television, lack of competence can result in impairment or loss of broadcast sound or picture, wrong presentation of items to be shown, or even damage to the equipment.

SUMMARY OF THE INVENTION

One object of the present invention is to provide an interactive teaching apparatus in which training is carried out on an actual operative piece of equipment which is itself the object of the study.

Another object of the present invention is to provide an interactive teaching apparatus on which training is done not by simulation but by use of actual equipment which is the object of the study.

Another object of the present invention is to provide an interactive teaching apparatus on which training is done using an actual design breadboard which is the object of the training.

According to the present invention there is provided an interactive teaching apparatus characterised by: an equipment which is the actual object of the training or study and which is either an actual operative piece of equipment or a design breadboard; an interface coupled to said equipment for deriving data from points in said equipment;

an interactive computer including a program which provides the background to the teaching exercise, monitors the progress of the trainee being taught, monitors said data which is supplied from said interface to said computer, and guides the trainee through the stages of the program; and a reproduction device controlled by said computer and comprising a reproduction medium with pre-recorded instructional sequences containing teaching information concerning said equipment and sequences showing the possible consequences of any action by the trainee.

Embodiments of the present invention can thus put the trainee in the same working environment that the trainee will later work in, and as a result removes the lengthy period which a trainee needs after any theoretical or simulated training to acquire a feel for actual operative equipment. Moreover, having the trainee operate, for example, real buttons, switches, gauges, potentiometers and other controls as appropriate to the particular equipment, helps the trainee to memorize their location and operation and therefore helps to cultivate a reflex reaction by the trainee to potential emergency situations. In the case of self-paced individual training, the computer provides the trainee with confidence and certainty that a certain procedure or alignment has been done correctly, or that a circuit has been built correctly.

The apparatus can be built around a main computer with an interactive touch-sensitive screen. The computer may guide the trainee and give the trainee advice in a simple way in an easy to follow visual and acoustic form.

The computer controls and enables the reproduction device and receives signals representing the data from the equipment under study. The data is derived from test points, where necessary by mechanical gauges and other suitable transducers coupled to points in the equipment. In each case the computer addresses a single selected test point singled out on a circuit or block diagram displayed on the interactive screen, and monitors and displays visually the data change as a result of the trainee's action. The data may be sampled and converted as necessary into a form suitable to be multiplexed into a serial data stream. The signals in this data stream may be compared with relevant data stored in the computer memory and in the monitoring program. Alternatively, or in addition, the data may be supplied to an oscilloscope, which may be a dual-channel digital storage oscilloscope thereby enabling the waveform derived from a test point to be compared with a stored reference waveform, and by adjustment of the equipment under study, matched with the reference waveform. The computer will issue visual and acoustic signals to guide the trainee and alarm warnings if the trainee takes any action which may damage the equipment or the apparatus. The computer may switch off part of the equipment or the apparatus. When an alarm has been generated, the computer may decide if a certain pre-recorded segment, with simulated consequences of the wrong action, needs to be replayed by the reproduction device, or whether the trainee requires some other form of supplementary guidance.

Provision may be made for creating faults and emergency situations to test the speed of the trainee's reactions.

A preferred embodiment of the invention may have provision for the following operations, although not all of them are necessarily present in every embodiment.

(1) Written material in manual form may be used to explain the object of each training session, the ways in which the equipment and the apparatus is or has to be configured and used, the different stages of instruction, and the role of warning alarm signals.

(2) The interactive screen may allow the trainee to begin the training session by obtaining the conceptual and theoretical background of the given exercise by having the reproduction device replay a pre-recorded video tape or disc, or by reading a particular part of a manual which is provided.

(3) The interactive screen may be coupled through the computer to a plotter, so enabling the trainee to make a hard copy of the display on the interactive screen for future reference.

(4) Having checked that the trainee understands the background material, which may be checked by displaying questions and analysing the answers given via the interactive screen, the reproduction device replays, on a television monitor or a projection television, a pre-recorded sequence from a video tape or disc showing in detail the next stage of the training. The video replay can be stopped and repeated at any time.

(5) When the trainee is confident of his or her understanding, a signal is given to the computer indicating readiness to work on the equipment.

(6) On receiving approval via the computer, the trainee can switch on the equipment and perform the training tasks specified. These tasks may, for example, include operation, testing, measuring, selecting a configuration of switches or a sequence of push-buttons, as well as dismantling some parts of the equipment. Visual and acoustic signals help follow the correct course of action.

(7) Any wrong action may immediately trigger a visual and/or acoustic alarm to stop the trainee from proceeding. A flashing message on the screen, or a synthesized voice signal, will recommend further action to be taken by the trainee. Eventually, a pre-recorded instructional segment may be replayed by the reproduction device to demonstrate possible consequences of the wrong action.

(8) After making sure that the trainee realised what was the error and its consequences, the computer may allow the continuation of the training session. At the end, it may congratulate the trainee, assess the trainee's performance and suggest further exercises.

The same configuration can be used to monitor practical exercises to build electronic or electrical circuits on specially designed breadboards and so-called tutors connected via the interface to the computer. In this case symbols of building blocks (electronic or electrical elements) will appear on the interactive screen together with a sketch of a block diagram. The trainee will first have to arrange properly and sequence the different elements to form a circuit on the interactive screen, then to build it out of components and integrated circuits on the breadboard intended for this purpose.

In this case the computer will constantly monitor the progress of the building process, will warn the trainee in the eventuality of wrong connections and will assess the quality of the final assembly. In this way exercises may be imagined going from building a simple operational amplifier to a complex sequencer or microprocessor controlled device.

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 1:
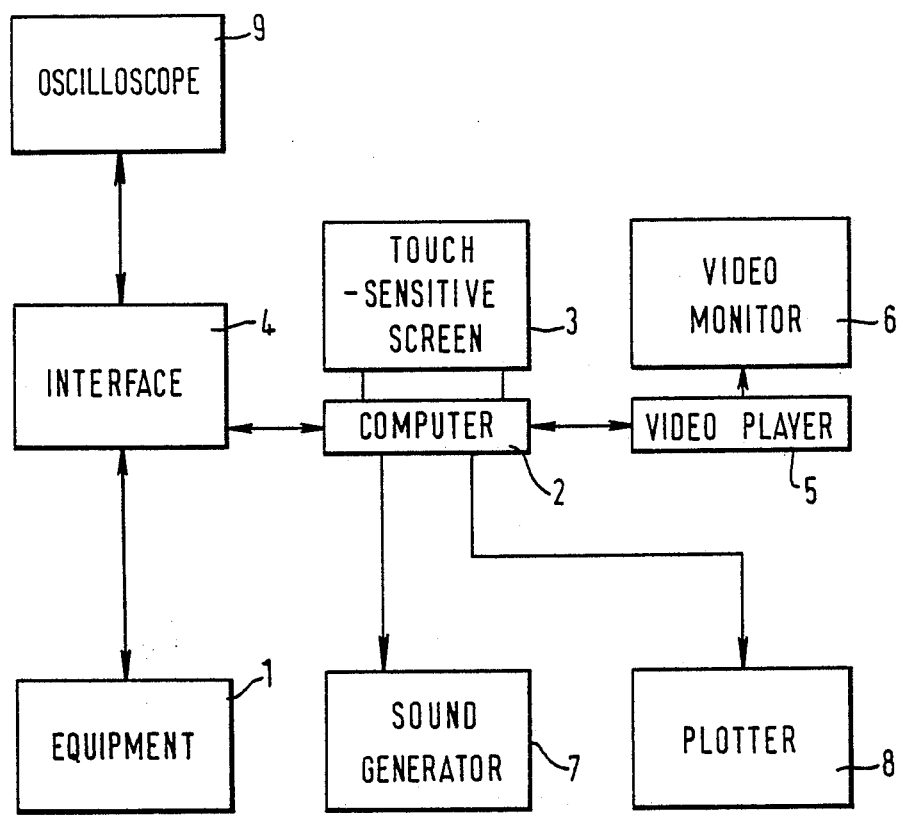
FIG. 1 shows in block diagrammatic form an embodiment of interactive teaching apparatus according to the present invention.

Referring first to FIG. 1, the first embodiment to be described is to be used in association with an actual operative piece of equipment 1, which is the actual object of the training or study, and which may, just by way of example, by a (PCM) pulse code modulation DASH (digital audio stationary head) format multitrack recorder or a broadcast-standard video tape recorder. The actual embodiment is made up of the elements 2 to 9, and these comprise a master computer 2 with which is associated a touch-sensitive interactive display screen 3. The computer 2 is coupled to the equipment 1 by way of a general purpose test interface 4, and is also connected to a video player 5 with which is associated a video monitor 6, and to a sound generator 7 and a hard copy plotter 8. The interface 4 is also connected to a digital storage oscilloscope 9, such as a Tektronix 2430. The video player 5 may use video tapes or discs, laser discs being preferred because of their large capacity and rapid access time. Suitable laser disc players are the Sony LDP-180 and Sony LDP-1500, etc.

The interface 4, which will be described in more detail below, is operative to derive data concerning the condition or operation of individual parts of the equipment 1. The condition or operation may give rise to a measurement or signal which may be basically mechanical or electrical, and in all cases one function of the interface 4 is to convert these data into suitable signals for supply to the computer 2 and to the oscilloscope 9. The interface 4 is preferably of general form, so that it can be coupled to different pieces of equipment 1, as the need arises. The use of a digital storage oscilloscope 9 simplifies the role of the interface 4, because such an oscilloscope 9 can directly digitize signals and waveforms derived from the equipment 1, and can itself be controlled by the computer 3.

Basically, the operation is as follows. The computer 2 executes a program designed to teach and guide the trainee through a predetermined procedure relating to the particular piece of equipment 1. The trainee is able to select his preferred exercise from an initialization menu displayed on the screen 3 of the computer 2, and is able to indicate his or her choice by touching the screen 3.

On the screen 3 are displayed step-by-step instructions on how the interface 4 is to be connected to the equipment 1. Alternatively, these instructions can be printed, and the necessary connection made before use of the apparatus begins. When the connection has been made, the computer 2 interrogates the interface 4 via a serial data link to establish whether the interface 4 is in good condition and operative, and whether the equipment 1 is in good condition and operative. A new general protocol will then be established to define a set of data commands from the computer 2 to the interface 4, and also to define the format of the responses from the interface 4 to the computer 2. This protocol will enable the computer 2 to recognize the presence of any number of interfaces 4 and their status. This means that a single computer 2 can be used in association with a plurality of pieces of equipment 1 which are connected to the computer 2 by respective interfaces 4.

The interface 4 comprises a microprocessor and is operative to decode instructions received from the computer 2. Such instructions may include those of a housekeeping nature, that is to say concerning the status of the interface 4 itself, or may form an instruction to select a test point on, for example, a printed circuit board in the equipment 1 to which the interface 4 is connected, and to measure or monitor the signal found at that test point. The monitored signal is, in appropriate cases, supplied to the oscilloscope 9 for display and/or comparison with a reference waveform. The microprocessor in the interface 4 is also programmed to compare all test point values against a table of known operating values. Should the value of the signal measured at any test point exceed a predetermined safe value, an interrupt is issued to the computer 2. This could, for example, result in an audible warning tone generated by the sound generator 7, or in more severe cases the shutdown of the equipment 1 and the termination of the program.

Comparison of the waveform of a signal derived from a test point and displayed on one channel of the oscilloscope 9 with a reference waveform derived from the store of the oscilloscope 9 and displayed on the other channel of the oscilloscope 9, enables the trainee to home-in on the correct setting of a control and to see the effect of making changes. An audible tone generated by the sound generator 7 may also be used in home-in the trainee on the correct setting for an adjustable control, by changes in the pitch or intensity of the sound.

The interface 4 comprises multiplexers (MPX) to enable the required test points to be selected. However, having regard not only to the requirements for training, but also the growing provision for self-diagnosis at least in electronic equipment, the multiplexers could, in the future, be installed by design within the equipment 1 itself. In the limit, therefore, future equipments 1 could have a multi-way connector installed, which could route a signal selected from test points within the equipment 1 to the interface 4, which in that case could be substantially simplified. The signal routed by the multiplexer can take any one of many forms, such as a direct current voltage, an alternating current voltage, a radio frequency, a pulse width, a phase, etc. In all cases, the signal is converted by the interface 1 to a suitable and preferably similar form of signal, in this particular case to a direct current voltage, prior to being digitized and supplied to the computer 2. In cases where a mechanical position or movement is to be sensed, then a suitable transducer is provided to produce an electrical signal for supply to the interface 4. The interface 4 is operative to sample and convert the incoming direct current voltages into a digital stream of data serialised by the microprocessor for transmission to the computer 2. Additionally, in appropriate cases, the interface 4 also routes the incoming signal from the equipment 1 to the oscilloscope 9. If the oscilloscope 9 is capable of digitizing signals and waveforms directly then, as mentioned above, this enables the interface 4 to be simplified.

Figure 2:
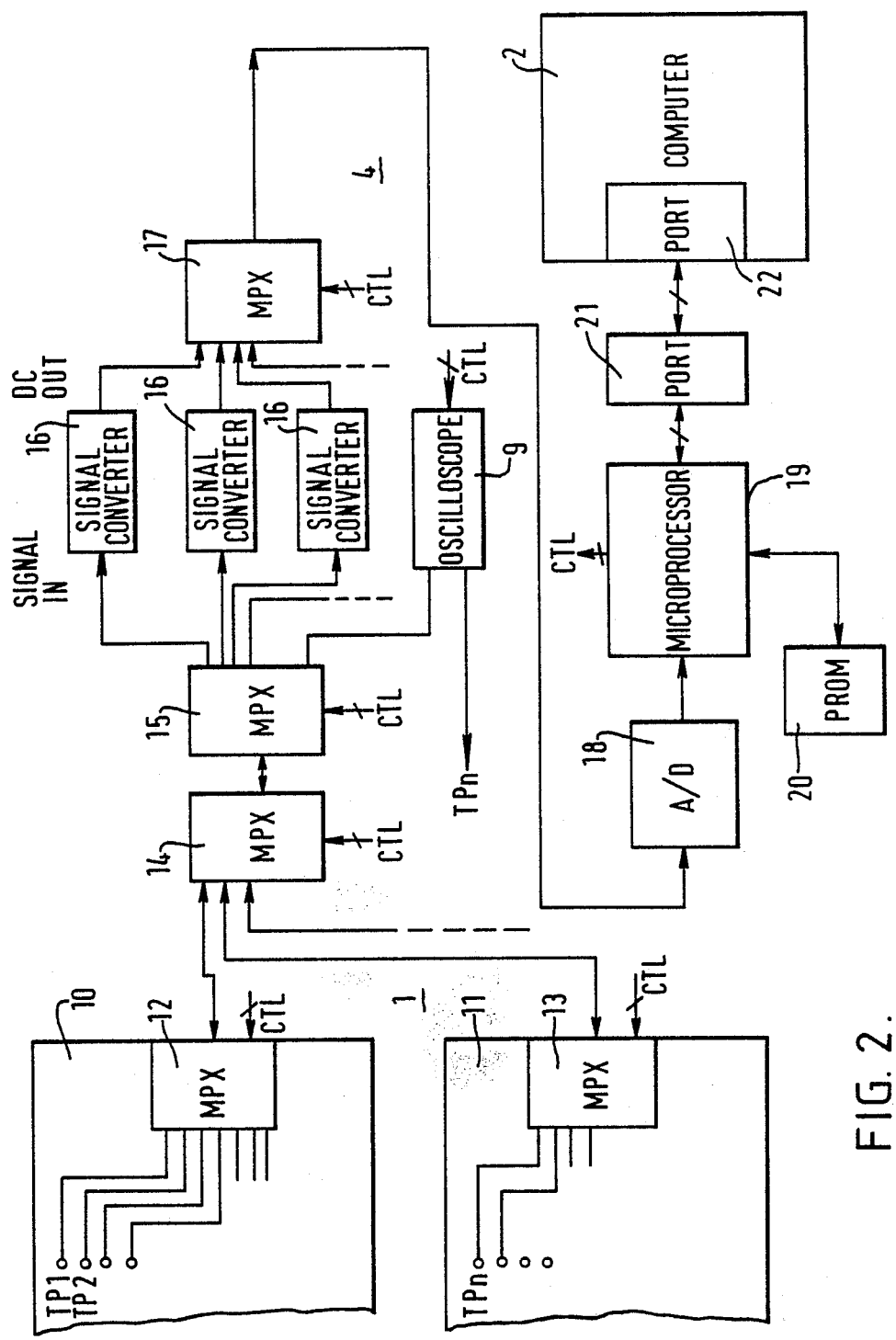
FIG. 2 shows in more detailed block diagrammatic form parts of the embodiment of FIG. 1.

Referring now to FIG. 2, this shows in more detailed block diagrammatic form the interface 4 of FIG. 1, part of the equipment 1 and the computer 2. The equipment 1 is assumed to be of an electronic nature comprising a plurality of printed circuit boards, of which circuit boards 10 and 11 are shown. Within each of the circuit boards 10 and 11 are a plurality of test points TP1, TP2, . . . TPn . . . Associated with each of the circuit boards 10 and 11 is a respective multiplexer 12 or 13 from which respective connections extend to the test points TP1, TP2, etc. Each of the multiplexers 12 and 13 also has a control input. Each of the multiplexers 12 and 13 is connected to a further multiplexer 14 associated with the equipment 1. The precise number and arrangement of the multiplexers 12, 13 and 14 will of course depend on the nature of the equipment 1, and in particular on the number of test points TP1, TP2, etc., and in the case of a simple piece of equipment 1, a single multiplexer 14 may be sufficient for all the test points TP1, TP2, etc.

The multiplexer 14 supplies an output to a multiplexer 15 forming part of the interface 4, and the multiplexer 15 has respective outputs corresponding to the respective test points TP1, TP2, etc., connected to respective signal converters 16, and an output, or if necessary outputs, corresponding to one or more of the test points TP1, TP2, etc., connected to the oscilloscope 9. In appropriate cases, some of the test points TP1, TP2, etc. may be connected directly to the oscilloscope 9. The precise nature of each individual signal converter 16 will depend on the nature of the input signal, but in each case the signal converter 16 will supply an output direct current voltage to a further multiplexer 17. The multiplexer 17 supplies an output to an analog-to-digital (A/D) converter 18, the digital output of which is supplied to a microprocessor 19 with which is associated a personality programmable read only memory (PROM) 20. The multiplexers 14, 15 and 17, like the multiplexers 12 and 13 and the oscilloscope 9 have control inputs, to which control signals are supplied by the microprocessor 19.

The microprocessor 19 is connected to the computer 2 by way of suitable ports 21 and 22. The computer 2 may, for example, be a Regency R-2C microprocessor-based computer (distributed in UK by Rediffusion) or a British Broadcasting Corporation (BBC) Model B computer. The Regency R-2C computer comprises a hard/-floppy disc drive, a keyboard, and a video display unit with a touch-sensitive interactive screen to form the screen 3 referred to above. It also controls the sound generator 7 and the plotter 8.

Figure 3:
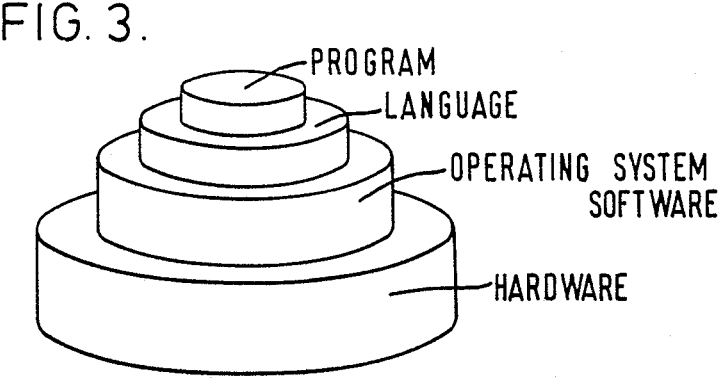
FIG. 3 shows diagrammatically interfacing of a computer program with hardware.
Figure 4:
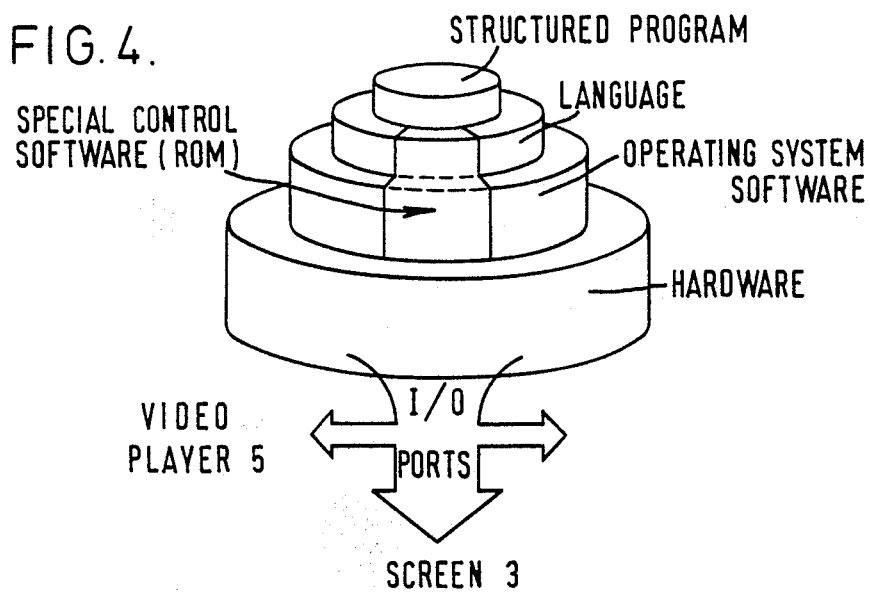
FIG. 4 shows diagrammatically a modified form of interfacing of a computer program with hardware.

The operating software for the Regency R-2C computer may be of the type which allows the trainee to execute a variety of interactive training programmes. As such programmes are well known and will in any case be governed by the particular equipment 1 on which training is to be given and on the precise nature of the training, the programmes will not be further described herein, except in relation to the contents of a particular laser disc described below. A typical software structure for a microcomputer consists of a high level language such as BASIC, in the case of the BBC computer, which interprets the user's program and is interfaced to the base level hardware by the machine operating system (MOS). The MOS makes the hardware simpler to use and caters for most general applications. This is shown diagrammatically in FIG. 3. The control of a video player 5 with a non-standard interface may need direct access to the hardware. In order to maintain an easy-to-read structure in the main program there is a need in this case for an additional interface which may be a custom read-only memory (ROM) to provide extra high level commands for the language and a program to control the relevant I/O ports. The ROM also interfaces to the screen 3, making the touch-sensitive areas appear clearly labelled. This ROM partly replaces the original language and the MOS by intercepting their sub-routines, in a way which is shown diagrammatically in FIG. 4. The commands can be accessed from the program using the selected language. Because it also makes use of the MOS, it is shown in parallel with it. For example, if a different computer 2 were used, another custom made ROM could supply the equivalent commands in order to interface the hardware with the new computer 2.

Figure 5:
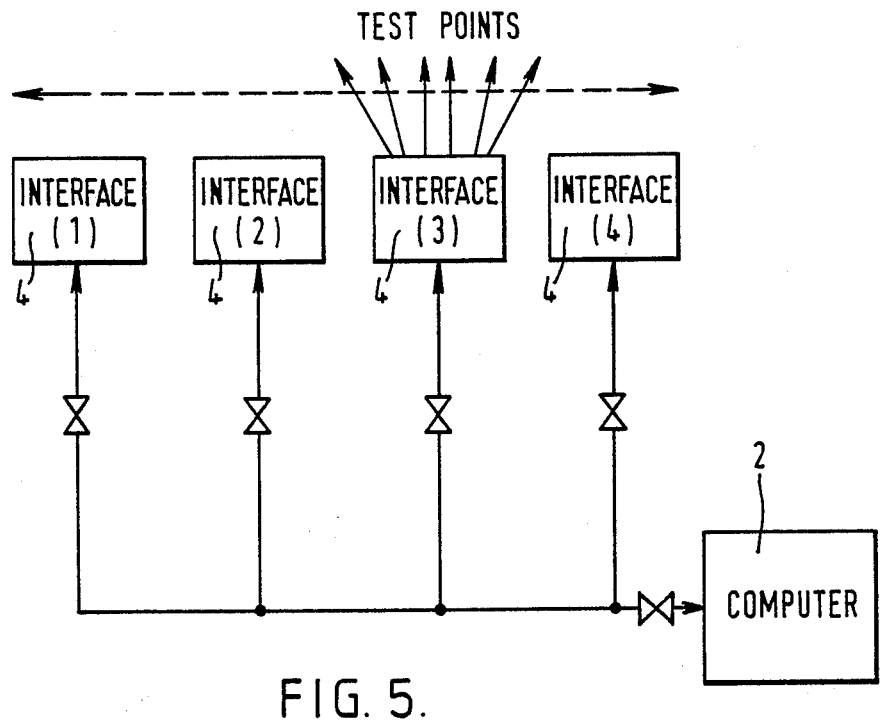
FIG. 5 shows in more detailed block diagrammatic form an alternative to part of the embodiment of FIG. 1.

The ports 21 and 22 may, for example, be RS-232 or RS-422 ports connected by a serial data link. A protocol is established to define the bidirectional transmission of data from the computer 2 to the interface 4 and vice versa. In the diagram of FIG. 2 it is assumed that the computer 2 is associated with a single interface 4, but a single computer 2 may be associated with a plurality of interfaces 4 as indicated diagrammatically in FIG. 5.

Various commands can be transmitted from the computer 2 to the interface 4, and the interface 4 then responds by transmitting data to the computer 2. The protocol used also defines such parameters as the baud rate and the parity. An example of suitable commands is set out in Table 1 below.

TABLE 1

EXAMPLE OF PROTOCOL USED IN DATA LINK

| NO | COMMAND DESCRIPTION | CODE (HEX) | REPLY (HEX) | COMMENT |
|---|---|---|---|---|
| 1 | INTERFACE SELECT | XX | ACK | Unselected interfaces drop off the loop (up to 256 interfaces could be selected) |
| 2 | INTERFACE IDENTIFY | XX | 00 FF | Each HEX number uniquely identifies a hardware-software configuration within the selected interface |
| 3 | INTERFACE STATUS | XX | 00 FF | Informs master computer whether interface is ON/OFF, SELF TEST, OK etc. |
| 4 | TEST POINT STATUS | XX | 00 FF | All test points connected or else indicated test point(s) not connected in second byte |
|   |   |   | 00 FF | Byte 2: Test point(s) not connected |
| 5 | TEST POINT SELECT | XX | ACK | Test points 1 to 256 can be selected |
| 6 | TEST POINT DATA OK? | XX | YES/NO | Interface software compares test point data value against stored data. Is measured value within tolerance of safe operation? |
| 7 | TEST POINT DATA REQUEST | XX | ON OFF | Interface responds with data from selected test point. |
| 8 | TEST POINT STROBE MAN/AUTO | XX | ACK | Selected test point can be repeatedly sampled |
| 9 | TEST POINT STROBE SPEED | XX | ACK | Rate of sampling can be set |

The form and/or operation of some of the elements of the interface 4 shown in FIG. 2 will now be described in more detail.

The primary task of the microprocessor 19 is to decode commands which it receives from the computer 2 and to respond with relevant data. When a command has been decoded, it will enable a particular test point TP1, TP2, etc. from which data is required. The microprocessor 19 is set to supply appropriate controls to the relevant multiplexers 12 to 15 and 17 to access the selected test point TP1, TP2, etc. Alternatively, the test points TP1, TP2, etc. could be poled on a port number basis.

The microprocessor 19 further has provision to issue an interrupt to the computer 2 should one of the sampled test points TP1, TP2, etc., have measured data out of the region of safe operation of the equipment 1.

Figure 6:
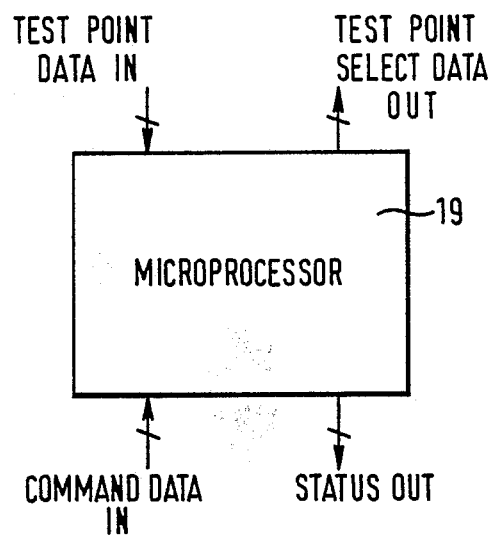
FIG. 6 shows in more detailed block diagrammatic form part of the embodiment of FIG. 1.

FIG. 6 shows in somewhat more detail the signal paths associated with the microprocessor 19. Command data in will be received from the computer 2 and will generally result in test point select data out. The response will be test point data in, and this will generally result in status out to the computer 2.

Returning to FIG. 2, the interface 4 as illustrated comprises the five multiplexers 12 to 15 and 17, although as indicated above the precise number and arrangement of the multiplexers used will depend upon the nature of the equipment 1, and in particular the number and arrangement of the test points TP1, TP2, etc. Each such multiplexer 12 to 15 and 17 is in effect a multi-way switch which is able to select one of several inputs to be connected through to its output. The selection process is under control of the microprocessor 19. The output of the last multiplexer in the chain, in the case of the FIG. 2 arrangement the multiplexer 17, is supplied as a direct current voltage to the A/D converter 18 which converts this direct current voltage into 8-bit digital data at a rate determined by the microprocessor 19. This digital data is then encoded by the microprocessor 19 and transmitted over the serial data link via the ports 21 and 22 to the computer 2.

Finally, the signal converters 16 are, as indicated above, of various possible types, depending in particular on the nature of the input signals. Thus, respective signal converters 16 may be operative to convert direct current to direct current, alternating current to direct current, frequency to direct current, pulse width (or phase) to direct current, or some other variable to direct current. These conversions must be carried out with sufficient accuracy not to compromise the overall accuracy of the data used in the apparatus.

The number and nature of the test points TP1, TP2, etc. in the equipment 1 will depend on the nature and complexity of the equipment 1 and on the precise form of measurement and/or adjustment appropriate to the particular test point TP1, TP2, etc.

An example of the contents of a typical laser disc for the video player 5, which in this case is for a training programme related to a Sony PCM-3324, which is a PCM DASH format multitrack recorder will now be described.

Side one of the laser disc offers two main menus. The first contains all the pre-session checks, in other words, all the checks an audio engineer is supposed to perform before a recording session. The second menu allows direct access to any one of the main twenty-nine adjustments available on the PCM-3324 machine.

The pre-session checks refer to the servo system, the twenty-four record/playback paths, the two analog record/playback paths, the time code record/playback path and the operation of the twenty-four analog-to-digital and digital-to-analog converters. When any one check is selected the programme will begin by displaying a video sequence showing the way the PCM-3324 machine should respond. A repetition function allows as many viewings as desired. At the end of the check the programme prompts the trainee to confirm, by touching the screen 3, that his PCM-3324 machine responds correctly. Should the PCM-3324 machine not be working in the correct manner, the computer 2 will suggest further checks and will recommend the appropriate electrical or mechanical adjustment.

If the configuration includes the oscilloscope 9, reference waveforms are automatically displayed on one oscilloscope channel, while the second oscilloscope channel displays the waveform coming from the test point TP1, TP2, etc. in the circuit at which the adjustment is being performed. The trainee has only to match the two waveforms to be sure that particular alignment is correct.

The computer 2 will also compare two values, one a result of the trainee's adjustment and another a reference value, and will display a pass/fail message on the screen 3. In this way adjustments are performed under the control of the system and feedback is instantly available. The trainee does not even need to know how to set up the oscilloscope 9 as this is done automatically.

The trainee can leave an adjustment procedure at any time and return to the primary menu if he or she feels the need for more information.

Side two of the laser disc contains some miscelleneous adjustments not related to the pre-session checks, nine fault-finding paths, nineteen board checks, a functional description of all switches and displays resident on board edges and a number of databases with waveforms, locations of boards and adjustments, close-ups of the circuit and so on.

Checks are structured similarly to adjustments, except that no adjustment is required. The aim is to confirm that specified test points TP1, TP2, etc. have the expected waveforms.

The functional description of the switches and displays on the laser disc allows the location, function and description of any one of them to be displayed on the screen 3 on request.

Returning to FIG. 1, the first embodiment which has been described above is for use in training on an actual operative piece of equipment 1 such as a proprietary operational equipment which is to be tested and/or aligned by the trainee. However, the invention is equally applicable to the teaching of design fundamentals where, for example, the trainee is required physically to construct an actual circuit on a breadboard.

Figure 7:
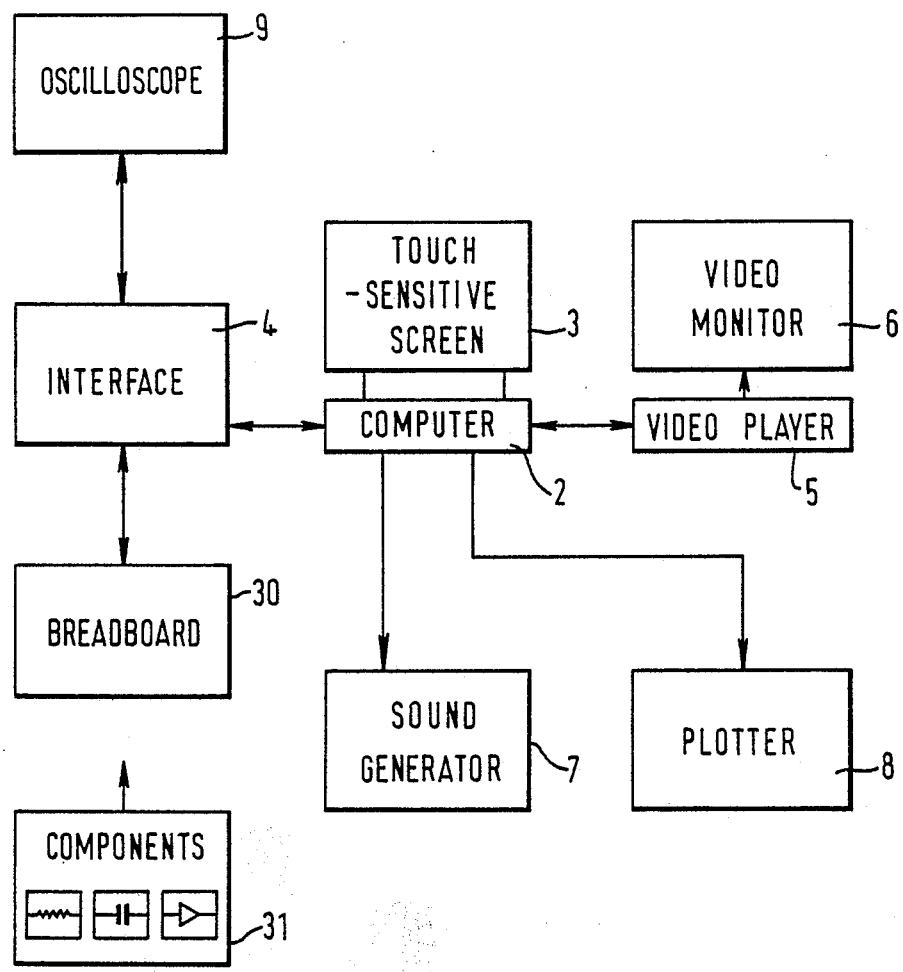
FIG. 7 shows in block diagrammatic form another embodiment of interactive teaching apparatus according to the present invention.

Such an apparatus forms the second embodiment which is shown in FIG. 7, and which will be seen to differ only quite slightly from the first embodiment shown in FIG. 1. In place of the equipment 1 of FIG. 1, there is in the second embodiment of FIG. 7 provided a breadboard 30 and a range of components 31 for use in constructing a circuit on the breadboard 30. As in the first embodiment, an interface 4 is connected to test points in the breadboard 30, and the remainder of the second embodiment is very similar in form and operation to the first embodiment. The operating program for the computer 2 need not assume that the trainee has any prior knowledge of construction, other than, perhaps, the ability to differentiate between the different components 31, some of which are shown purely by way of example in FIG. 7. The trainee will be initiated in the construction process by observing instructional material derived from a video tape or disc by the video player 5 for display on the video monitor 6. The trainee may first assemble the circuit on the touch-sensitive interactive screen 3 by selecting displayed components to complete a displayed block diagram, and will then construct the circuit on the breadboard 30 using components from the components 31. During the construction the computer 2 provides interactive feedback on the progress of the construction and judges the finished circuit.

Figure 8:
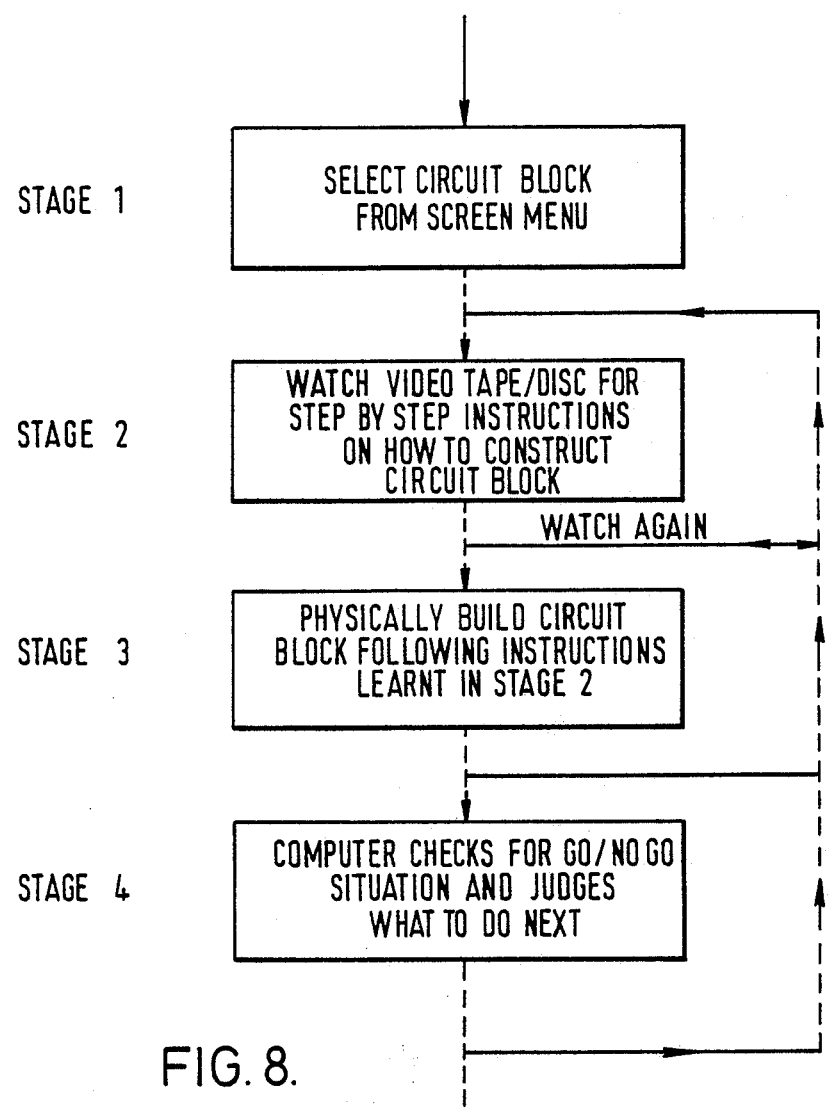
FIG. 8 shows a flow path for use with the embodiment of FIG. 7.

The exercise may progress through the following stages shown in the flow path of FIG. 8:

Stage 1

The computer 2 presents on the screen 3 a menu from which the trainee can select a particular circuit to construct.

Stage 2

Under control of the program in the computer 2, a video tape or disc is played by the video player 5 to show the trainee how to build the chosen circuit. The sequential instructions are preferably shown taking place on a breadboard, identical to the breadboard 30. The trainee can view the video segments as many times as necessary until he or she feels confident to construct the actual circuit.

Stage 3

The trainee physically constructs the circuit on the breadboard 30 using components from the components 31. These are preferably plug-in components. The component tolerances are selected according to the complexities of the circuit to be built, and in dependence on the manufacturing tolerances which the program of the computer 2 is able to deal with.

Stage 4

The computer 2, via the interface 4, monitors all the relevant test points on the breadboard 30; where appropriate, displays a waveform on the oscilloscope 9 for comparison with a stored reference waveform; and, under program control, measures direct current or alternating current voltages in the case of analog blocks; and detects the high and low logic levels in the case of integrated circuits and other digital blocks. The computer 2 will interpret the results obtained from such measurements and judge whether the construction or instructions are being successfully carried out or not.

If yes, then the computer 2 will compliment the student and return to the menu for the next practical instruction.

If no, then the computer 2 will judge whether the instruction has failed due to incorrect assembly, or perhaps due to wrong component values in the case of analog blocks. The computer 2 may then either suggest areas where the fault may lie, or may select from the instructional material appropriate video segments for replay by the video player 5.

It should be noted that the efficiency of the judgement stage is to a large extent dependent on the number of modes that need to be monitored through the interface 4. It is also dependent on whether the circuit blocks are analog or digital, or a combination of the two. A digital-only circuit block is the easiest on which to provide interactive feedback, due to the simple go/nogo nature of the circuit operation. However, the concept can readily be extended to analog or mixed analog/digital circuit blocks as commonly encountered in the broadcast service environment and many other areas of industry and education.

In this embodiment the breadboard 30 can be used for the construction of a large variety of different circuits, but it will usually be the case that the interface 4 is dedicated to the particular breadboard 30, the nodes in which are multiplexed to the interface 4.

Although specific embodiments have been described above, it will be understood that various modifications are possible without departing from the scope of the appended claims. In particular, the precise form of the interface, and in particular the form and arrangement of the multiplexers and their connections to the test ponits will be very dependent on the nature of the equipment on which training is to be carried out. Moreover, it is envisaged that equipment will increasingly have built-in provision for deriving data from test points within the equipment. The equipment with which the apparatus can be used is not limited to electronic equipment, the sole requirement being that data can be derived from the test points in electrical form, by use of transducers if necessary.

I claim:

1. An interactive teaching apparatus comprising:
   an actual equipment which is the ultimate object of a training or study and which is either an actual operative piece of equipment or a design breadboard, said equipment being intended for operation within a safe range of operation;
   an interface coupled to said equipment for deriving data from test points in said equipment;
   an interactive computer including a program for providing information ancillary to the teaching exercise, monitoring the progress of a trainee being taught, monitoring said data which is supplied from said interface to said computer, and guiding the trainee through stages of the program;
   said computer being responsive to said data supplied from said interface to detect operation of said equipment outside said safe range of operation and to protect said equipment from malfunction due to the detected operation;
   a reproduction device controlled by said computer and comprising a reproduction medium with pre-recorded instructional sequences containing teaching information concerning said equipment and sequences showing the possible consequences of any action by the trainee; and
   display means capable of being coupled to said test points in said equipment so as to be supplied with signals from the test points for forming a display indicating the actual status of said test points, said display means also forming a reference display, whereby the conformity of said actual status to a reference status can be judged.

2. Apparatus according to claim 1 wherein said interface is coupled to a plurality of test points in said equipment and supplies signals in electrical form concerning said test points to said computer.

3. Apparatus according to claim 2 wherein said interface comprises a plurality of signal converters for converting signals received from respective said test points to direct current voltage signals.

4. Apparatus according to claim 3 wherein said interface comprises an analog-to-digital converter which receives said direct current voltage signals and converts them to digital signals.

5. Apparatus according to claim 1 wherein said computer includes a touch-sensitive screen.

6. Apparatus according to claim 1 wherein said reproduction device is a video tape or disc.

7. Apparatus according to claim 1 further comprising a hard copy plotter controlled by said computer to enable a hard copy of the display on the screen of said computer to be made.

8. Apparatus according to claim 1, wherein said computer is responsive to the detected operation outside said safe range of operation to alter operation of said equipment.

9. Apparatus according to claim 8, wherein said computer alters operations of said equipment by shutting down said equipment.

10. An interactive teaching apparatus comprising:
    an equipment which is the actual object of a training or study and which is either an actual operative piece of equipment or a design breadboard, said equipment being intended for operation within a safe range of operation;
    an interface coupled to said equipment for deriving data from points in said equipment;
    an interactive computer including a program for providing information ancillary to the teaching exercise, monitoring the progress of a trainee being taught, monitoring said data which is supplied from said interface to said computer, and guiding the trainee through stages of the program;
    said computer being responsive to said data supplied from said interface to detect operation of said equipment outside said safe range of operation and to protect said equipment from malfunction due to the detected operation;

a reproduction device controlled by said computer and comprising a reproduction medium with prerecorded instructional sequences containing teaching information concerning said equipment and sequences showing the possible consequences of any action by the trainee; and an oscilloscope capable of being coupled to test points in said equipment so as to be supplied with signals from said test points for display on said oscilloscope as waveforms.

11. Apparatus according to claim 10 wherein said oscilloscope is a dual-channel digital storage oscilloscope enabling waveforms derived from one of said test points to be compared with a storage waveform.

12. An interactive teaching apparatus comprising:

an equipment which is the actual object of a training or study and which is either an actual operative piece of equipment or a design breadboard, said equipment being intended for operation within a safe range of operation;

an interface coupled to said equipment for deriving data from points in said equipment;

an interactive computer including a program for providing information ancillary to the teaching exercise, monitoring the progress of a trainee being taught, monitoring said data which is supplied from said interface to said computer, and guiding the trainee through stages of the program;

said computer being responsive to said data supplied from said interface to detect operation of said equipment outside said safe range of operation and to protect said equipment from malfunction due to the detected operation; and a reproduction device controlled by said computer and comprising a reproduction medium with prerecorded instructional sequences containing teaching information concerning said equipment and sequences showing the possible consequences of any action by the trainee;

said interface being coupled to a plurality of test points in said equipment and supplying signals in electrical form concerning said test points to said computer;

wherein said interface comprises:

a plurality of signal converters for converting signals received from respective said test points to direct current voltage signals;

an analog-to-digital converter which receives said direct current voltage signals and converts them to digital signals; and a microcomputer which receives said digital signals and supplies them in serial form to said computer, and which receives command signals from said computer and in dependence thereon interrogates said test points.

13. Apparatus according to claim 12 wherein said microcomputer supplies an interrupt to said computer if said digital signals represent data out of said safe range of operation in respect of one of said test points.

* * * * *